United States Patent
Yueh et al.

(10) Patent No.: US 10,996,912 B2
(45) Date of Patent: May 4, 2021

(54) TILED DISPLAY SYSTEM AND TILED DISPLAY DEVICE

(71) Applicant: InnoLux Corporation, Miao-Li County (TW)

(72) Inventors: Jui-Jen Yueh, Miao-Li County (TW); Kuan-Feng Lee, Miao-Li County (TW); Yuan-Lin Wu, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 7 days.

(21) Appl. No.: 16/054,407

(22) Filed: Aug. 3, 2018

(65) Prior Publication Data

US 2020/0042275 A1 Feb. 6, 2020

(51) Int. Cl.
   *G06F 3/14* (2006.01)
   *G09G 5/12* (2006.01)
   *G06F 3/147* (2006.01)

(52) U.S. Cl.
   CPC ............ *G06F 3/1446* (2013.01); *G06F 3/147* (2013.01); *G06F 3/1431* (2013.01); *G09G 5/12* (2013.01); *G09G 2300/026* (2013.01)

(58) Field of Classification Search
   CPC ...... G06F 3/1446; G06F 3/1431; G06F 3/147; G09G 5/12; G09G 2300/026
   See application file for complete search history.

(56) References Cited

U.S. PATENT DOCUMENTS

| | | | |
|---|---|---|---|
| 2006/0282855 A1* | 12/2006 | Margulis | G06F 3/1431 725/43 |
| 2007/0057865 A1* | 3/2007 | Song | G06F 3/1431 345/1.1 |
| 2008/0211825 A1* | 9/2008 | Sunakawa | G06F 3/1446 345/581 |
| 2016/0335039 A1 | 11/2016 | Cho | |
| 2016/0357493 A1* | 12/2016 | Zerwas | G06F 3/1438 |
| 2017/0115946 A1 | 4/2017 | Kim | |
| 2017/0148374 A1* | 5/2017 | Lee | G09G 5/14 |
| 2019/0065133 A1* | 2/2019 | Liu | G06F 3/1446 |

* cited by examiner

*Primary Examiner* — Alexander Eisen
*Assistant Examiner* — Kebede T Teshome
(74) *Attorney, Agent, or Firm* — Muncy, Geissler, Olds & Lowe, P.C.

(57) ABSTRACT

A tiled display system is disclosed, which includes: a plurality of display devices; and a controller driving the plurality of display devices to enable each display device to display a sub-frame, all sub-frames being tiled as one frame, wherein the display devices include: a first display device that starts displaying first and a last display device that starts displaying last, the first display device displays the sub-frame at a first time point, the last display device displays the sub-frame at a last time point, and the first time point and the last time point satisfy an equation:

$0 < (Tn - T1) \leq (1/H1) \times [(N-1)/N]$, where T1 is the first time point, Tn is the last time point, H1 is a refresh rate of each display device, and N is a number of the display devices. In addition, a display device including a plurality of display panels is also disclosed.

20 Claims, 10 Drawing Sheets

TILED DISPLAY SYSTEM AND TILED DISPLAY DEVICE

BACKGROUND

1. Field

The present disclosure relates to a tiled display system and a tiled display device. More specifically, the present disclosure relates to a tiled display system and a tiled display device which can synchronously display a frame.

2. Description of Related Art

With the continuous advancement of technologies related to display devices, the applications of the display devices are not limited to monitors, mobile phones, laptops, televisions, etc. Nowadays, tiled display systems are developed to extend the applications of the display devices to video walls, advertising boards, and other electronic devices for displaying large images.

The tiled display system comprises a plurality of display devices, and each display devices displays one sub-frame of one frame, and all sub-frames are tiled into the one frame. However, if the sub-frames are not synchronously displayed, there may be a flicker problem occurred.

Therefore, it is desirable to provide a tiled display system or a tiled display device with which the flicker problem can be improved.

SUMMARY

The present disclosure provides a tiled display system, which comprises: a plurality of display devices; and a controller driving the plurality of display devices to enable each display device to display a sub-frame, all sub-frames being tiled as one frame, wherein the display devices comprise: a first display device that starts displaying first and a last display device that starts displaying last, the first display device displays the sub-frame at a first time point, the last display device displays the sub-frame at a last time point, and the first time point and the last time point satisfy an equation:

$$0<(Tn-T1)\leq(1/H1)\times[(N-1)/N],$$

where T1 is the first time point, Tn is the last time point, H1 is a refresh rate of each of the display devices, and N is a number of the display devices.

The present disclosure further provides a tiled display device, which comprises: a driving substrate; a plurality of display panels disposed on the driving substrate; and a controller driving the plurality of display panels via the driving substrate to enable each display panel to display a sub-frame, all sub-frames being tiled as one frame, wherein the display panels comprise: a first display panel that starts displaying first and a last display panel that starts displaying last, the first display panel displays the sub-frame at a first time point, the last display panel displays the sub-frame at a last time point, and the first time point and the last time point satisfy an equation:

$$0<(Tm-T1)\leq(1/H2)\times[(M-1)/M],$$

where T1 is the first time point, Tm is the last time point, H2 is a refresh rate of each of the display panels, and M is a number of the display panels.

Other novel features of the disclosure will become more apparent from the following detailed description when taken in conjunction with the accompanying drawings.

DETAILED DESCRIPTION OF EMBODIMENT

The following embodiments when read with the accompanying drawings are made to clearly exhibit the above-mentioned and other technical contents, features and/or effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element.

Furthermore, the terms recited in the specification and the claims such as "connect" is intended not only directly connect with other element, but also intended indirectly connect and electrically connect with other element.

Furthermore, when a value is in a range from a first value to a second value, the value can be the first value, the second value, or another value between the first value and the second value.

In addition, the features in different embodiments of the present disclosure can be mixed to form another embodiment.

Embodiment 1

Figure 1A:
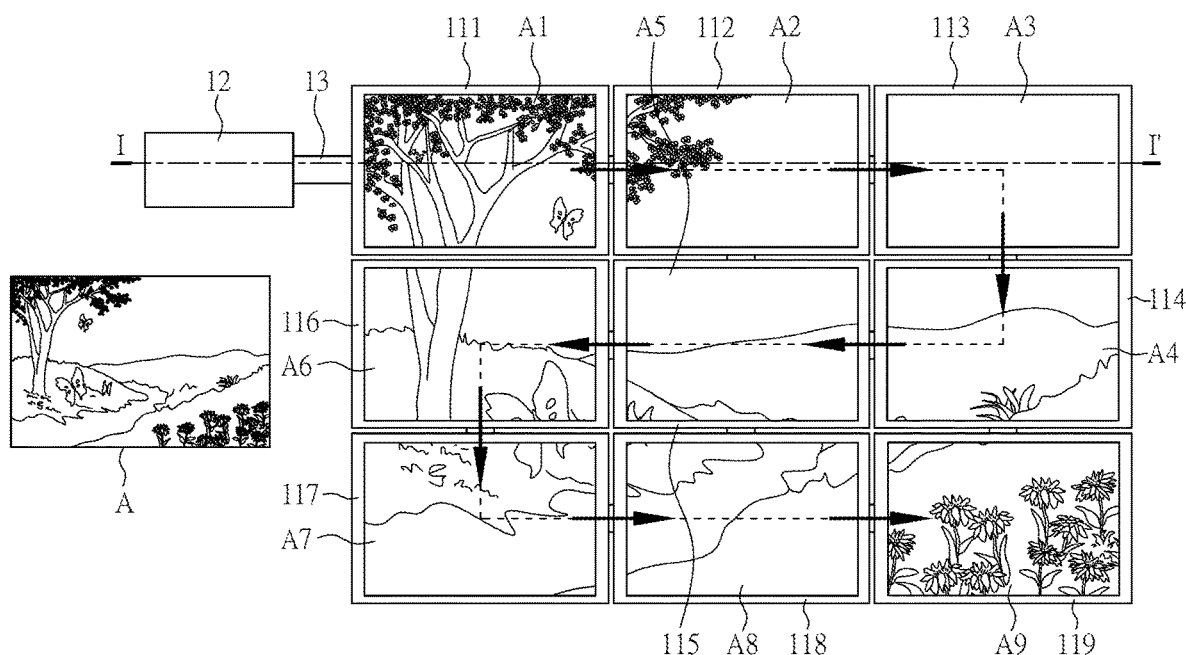
FIG. 1A is a perspective view of a tiled display system according to Embodiment 1 of the present disclosure.
Figure 1B:
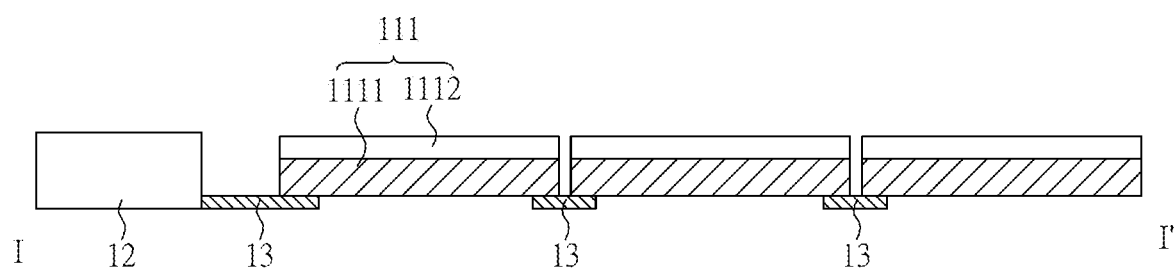
FIG. 1B is a cross-sectional view of a tiled display system according to Embodiment 1 of the present disclosure.

FIG. 1A is a perspective view of a tiled display system of the present embodiment, and FIG. 1B is a cross-sectional view taken along the line I-I' indicated in FIG. A.

The tiled display system of the present embodiment comprises: a plurality of display devices 111, 112, 113, 114, 115, 116, 117, 118 and 119; and a controller 12 driving the display devices 111, 112, 113, 114, 115, 116, 117, 118 and 119. Herein, the display device 111 comprises a driving substrate 1111 and a display panel 1112 disposed on the driving substrate 1111, and the driving substrate 1111 drives the display panel 1112 disposed thereon and has a refresh rate H1. The structures of the display devices 112, 113, 114, 115, 116, 117, 118 and 119 are similar to that of the display device 111, and thus a detailed description therefor is deemed unnecessary.

In the present embodiment, the display devices 111, 112, 113, 114, 115, 116, 117, 118 and 119 are electrically connected to each other in a cascading manner. In addition, the display devices 111, 112, 113, 114, 115, 116, 117, 118 and 119 are electrically connected to each other in a wired manner. Also, the controller 12 is electrically connected to the display device 111 in a wired manner to drive the display devices 111, 112, 113, 114, 115, 116, 117, 118 and 119. In the present embodiment, the display devices 111, 112, 113, 114, 115, 116, 117, 118 and 119 are electrically connected to each other via circuit boards 13, and the controller 12 is also electrically connected to the display device 111 via another circuit board 13. In the present embodiment, the tiled display system comprises nine display devices 111, 112, 113, 114, 115, 116, 117, 118, 119, which are arranged in juxtaposition and specifically in a 3×3 array. However, the number and the arrangement of the display devices are not limited thereto, and can be adjusted according to the actual requirement.

When a frame A is going to be displayed on the tiled display system, the frame A is divided into a plurality of sub-frames A1 to A9, and the number of the sub-frames A1 to A9 is equal to the number of the display devices 111, 112, 113, 114, 115, 116, 117, 118 and 119. In order to make the controller 12 drive the display devices 111, 112, 113, 114, 115, 116, 117, 118 and 119 to enable each display device to synchronously display its sub-frame A1 to A9, the tiled display system of the present embodiment satisfies the following requirements.

Herein, one of the display devices 111, 112, 113, 114, 115, 116, 117, 118 and 119 that starts displaying first is denoted as a first display device, such as the display device 111, and another one of the display devices 111, 112, 113, 114, 115, 116, 117, 118 and 119 that starts displaying last is denoted as a last display device, such as the display device 119. The first display device 111 displays the sub-frame A1 at a first time point, and the last display device 119 displays the sub-frame A9 at a last time point. The first time point and the last time point satisfy an equation (I):

$$0 < (Tn - T1) \le (1/H1) \times [(N-1)/N] \qquad \text{(I)},$$

where T1 is the first time point, Tn is the last time point, H1 is a refresh rate of each display device, and N is a number of the display devices 111, 112, 113, 114, 115, 116, 117, 118 and 119. In addition, N is an integer greater than 1. In the present embodiment, N is nine.

Herein, the refresh rate can be in a range from 60 Hz to 3840 Hz, but the present disclosure in not limited thereto.

When the tiled display system satisfies the above requirement, the frame A can be synchronously displayed on the display devices 111, 112, 113, 114, 115, 116, 117, 118 and 119 within a frame time, such as a reciprocal of the refresh rate H1, to improve the flicker problem. In the present disclosure, the term "synchronous" does not intend to limit to "happen in precisely the same time." For example, if a frame is displayed on different display devices at different time points within a frame time, the frame can be regarded as being synchronously displayed.

For example, as shown in FIG. 1A, the frame A is a frame to be displayed on the tiled display system. Because the tiled display system of the present embodiment comprises nine display devices 111, 112, 113, 114, 115, 116, 117, 118 and 119, the frame A is divided into nine sub-frames A1 to A9 to be displayed on the display devices 111, 112, 113, 114, 115, 116, 117, 118 and 119, respectively.

Figure 2:
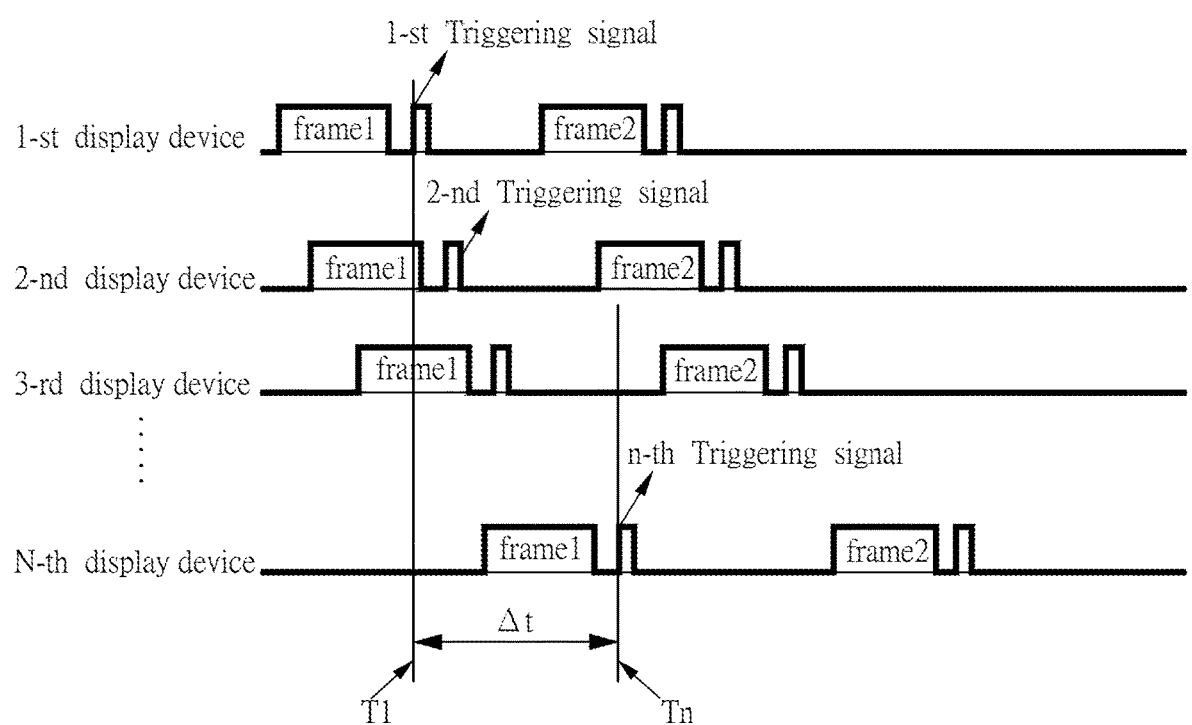
FIG. 2 is a timing diagram showing a synchronous timing control according one aspect of the present disclosure.

FIG. 2 is a timing diagram showing a synchronous timing control according to one aspect of the present disclosure. The controller 12 outputs frame data (for example, the frame 1) of one frame, which is transmitted to the 1-st display device, the 2-nd display device, the 3-rd display device . . . , and the N-th display device in a sequence of cascading, and then outputs triggering signals (1-st triggering signal to n-th triggering signal) to the 1-st display device, the 2-nd display device, the 3-rd display device . . . , and the N-th display device in a sequence of cascading. Upon receiving the triggering signals (1-st triggering signal to n-th triggering signal), the display devices (1-st display device to N-th display device) respectively starts displaying corresponding frame data of the frame 1 (i.e., displaying respective sub-frames). After outputting frame data (frame 1) of one frame, the controller 12 outputs another frame data (for example, the frame 2) of the next frame, which is transmitted to the 1-st display device, the 2-nd display device, the 3-rd display device . . . , and the N-th display device in sequence, and then outputs the triggering signals (1-st triggering signal to n-th triggering signal) to the 1-st display device, the 2-nd display device, the 3-rd display device . . . , and the N-th display device in sequence. Upon receiving the triggering signals (1-st triggering signal to n-th triggering signal), the display devices (1-st display device to N-th display device) respectively starts displaying corresponding frame data of the frame 2 (i.e., displaying respective sub-frames). Similar process is applied for displaying the subsequent frame and thus a detailed description is deemed unnecessary. Herein, as the display devices are connected in a cascading manner, the 1-st display device is the display device that receives the 1-st triggering signal and starts displaying first, and the time point that the 1-st display device receives the triggering signal and starts displaying is denoted as the first time point (T1). The N-th display device is the display device that receives the n-th triggering signal and starts displaying last, and the time point that the N-th display device receives the n-th triggering signal and starts displaying is denoted as the last time point (Tn). The first time point (T1) and the last time point (Tn) satisfy the above equation (I).

In the present embodiment, the frame data and the triggering signals are transmitted through different signal lines respectively, but the present disclosure is not limited thereto. For example, the frame data of the frame 1 and the frame 2 are transmitted through a first signal line and the 1-st triggering signal to the n-th triggering signal are transmitted through a second signal line. FIG. 2 shows the timings of the frame data and the triggering signals in an exemplary purpose. In the present disclosure, output "in sequence" means output "orderly in a cascading manner" and does not limit to output "continuously in a cascading manner". For example, two subsequence sub-frames may partially overlap each other in a timeline, or two subsequence triggering signals may separate from each other by an interval in a timeline.

Hereinafter, the example in which the synchronous timing control shown in FIG. 2 is applied to the tiled display system shown in FIG. 1A is illustrated. In this case, N and n in FIG. 2 are nine.

As shown in FIG. 1A to FIG. 2, the controller 12 outputs frame data (for example, the frame 1 shown in FIG. 2 is equivalent to the frame A shown in FIG. 1A), which is transmitted to the display devices 111, 112, 113, 114, 115, 116, 117, 118 and 119 in a sequence of cascading via the circuit boards 13 shown in FIG. 1B. Herein, the frame data is transmitted to all the display devices 111, 112, 113, 114, 115, 116, 117, 118 and 119 in a wired manner. In more specifically, each of the display devices 111, 112, 113, 114, 115, 116, 117, 118 and 119 receives the frame data to display its sub-frame A1 to A9. The frame data received by different display devices may be different, but the present disclosure is not limited thereto. If the frame data is the same, different display devices can retrieve its own part from the frame data. Then, the controller 12 outputs triggering signals (for example, the 1-st triggering signal to the 9-th triggering signal). After the display device 111 receives the 1-st triggering signal, the display device 111 starts to display the sub-frame A1. Similarly, the display device 112 starts to display the sub-frame A2 when the display device 112 receives the 2-nd triggering signal. Similar process is applied for displaying the subsequent sub-frames A3 to A9 and thus a detailed description is deemed unnecessary. Thus, all the sub-frames A1, A2, A4, A4, A5, A6, A7, A8, A9 are tiled as one frame A. Herein, the time point that display device 111 receives the 1-st triggering signal is defined as the first time point, and the time point that the display device 119 receives the 9-th triggering signal is defined as the last time point.

Embodiment 2

Figure 3:
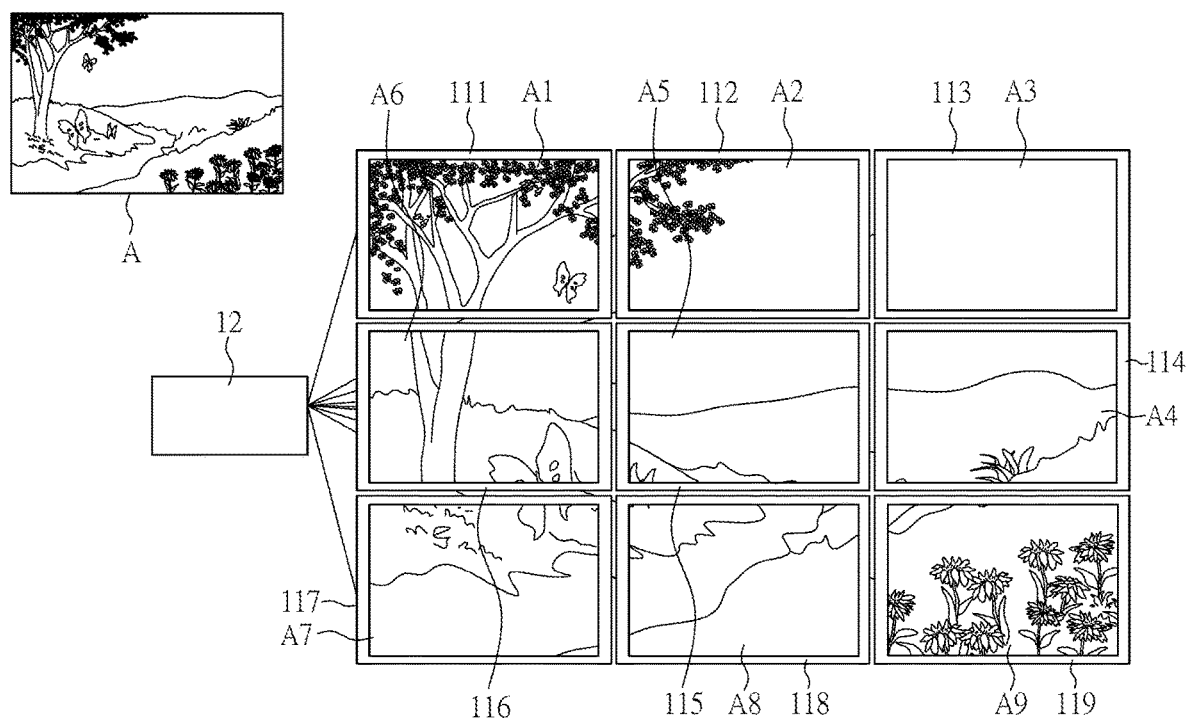
FIG. 3 is a perspective view of a tiled display system according to Embodiment 2 of the present disclosure.

FIG. 3 is a perspective view of a tiled display system of the present embodiment. The tiled display system of the present embodiment is similar to that of Embodiment 1, except for the following differences.

In the present embodiment, the controller 12 is electrically connected to all the display devices 111, 112, 113, 114, 115, 116, 117, 118 and 119 in a wired manner. Thus, when the controller 12 outputs frame data of the frame to the display devices 111, 112, 113, 114, 115, 116, 117, 118 and 119, the frame data is directly transmitted to all the display devices 111, 112, 113, 114, 115, 116, 117, 118 and 119. Similarly, when the controller 12 outputs triggering signals to the display devices 111, 112, 113, 114, 115, 116, 117, 118 and 119, each of the triggering signals is directly transmitted to the corresponding one of the display devices 111, 112, 113, 114, 115, 116, 117, 118 and 119. Herein, the frame data or the triggering signal being "directly" transmitted to the display device 111 means the frame data or the triggering signal is not transmitted to the display device 111 via another display device.

Figure 4:
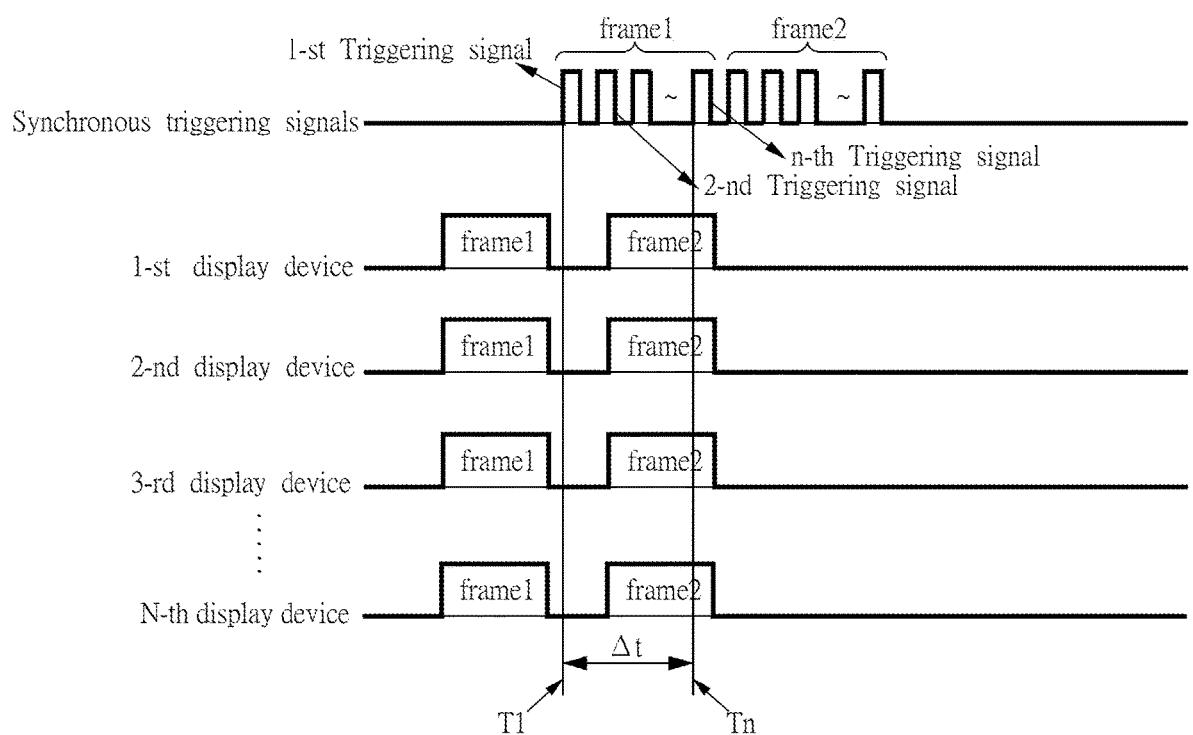
FIG. 4 is a timing diagram showing a synchronous timing control according to another aspect of the present disclosure.

FIG. 4 is a timing diagram showing a synchronous timing control according to one aspect of the present disclosure. The controller 12 outputs frame data (for example, the frame 1) of one frame to all the display devices (1-st display device, 2-nd display device, 3-rd display device . . . , N-th display device) first. Then, the controller 12 outputs synchronous triggering signals (including the 1-st triggering signal, the 2-nd triggering signal . . . , the n-th triggering signal) to all the display devices, and the synchronous triggering signals, for example, correspond to the frame 1. After outputting the frame data of frame 1, the controller 12 outputs another frame data (for example, the frame 2) of the next frame to all the display devices, and then outputs triggering signals (for example, corresponding to the frame 2) to all the display devices. When the 1-st display device receives the 1-st triggering signal, the 1-st display device starts to display a corresponding sub-frame. When the 2-nd display device receives the 2-nd triggering signal, the 2-nd display device starts to display a corresponding sub-frame. Similar process is applied and, when the N-th display device receives the n-th triggering signal, the N-th display device starts to display a corresponding sub-frame. Herein, the 1-st display device is the display device that receives the 1-st triggering signal and starts displaying first, and the time point that the 1-st display device receives the triggering signal and starts displaying is the first time point (T1). The N-th display device is the display device that receives the n-th triggering signal and starts displaying last, and the time point that the N-th display device receives the n-th triggering signal and starts displaying is the last time point (Tn). Thus, in the aspect shown in FIG. 4, the frame data and the triggering signals are transmitted to the display devices in a centralized distribution manner.

Hereinafter, the example that the synchronous timing control shown in FIG. 4 is applied to the tiled display system shown in FIG. 3 is illustrated. In this case, N and n in FIG. 4 are nine.

As shown in FIG. 3 and FIG. 4, the controller 12 outputs frame data (for example, the frame 1 shown in FIG. 4 is equivalent to the frame A shown in FIG. 3), and the frame data is directly transmitted to all the display devices 111, 112, 113, 114, 115, 116, 117, 118 and 119. Herein, the same frame data is transmitted to all the display devices 111, 112, 113, 114, 115, 116, 117, 118 and 119. Then, the controller 12 outputs triggering signals (for example, the 1-st triggering signal to the 9-th triggering signal), and the triggering signals are directly transmitted to the display devices 111, 112, 113, 114, 115, 116, 117, 118 and 119, respectively. The display device 111 starts to display the sub-frame A1 when the display device 111 receives the 1-st triggering signal, the display device 112 starts to display the sub-frame A2 when the display device 112 receives the 2-nd triggering signal. Similar process is applied for displaying the subsequent sub-frames A3 to A9 and thus a detailed description is deemed unnecessary. Thus, all the sub-frames A1, A2, A3, A4, A5, A6, A7, A8 and A9 are tiled as one frame A. Herein, the time point that display device 111 receives the 1-st triggering signal is defined as the first time point, and the time point that the display device 119 receives the 9-th triggering signal is defined as the last time point.

Embodiment 3

Figure 5:
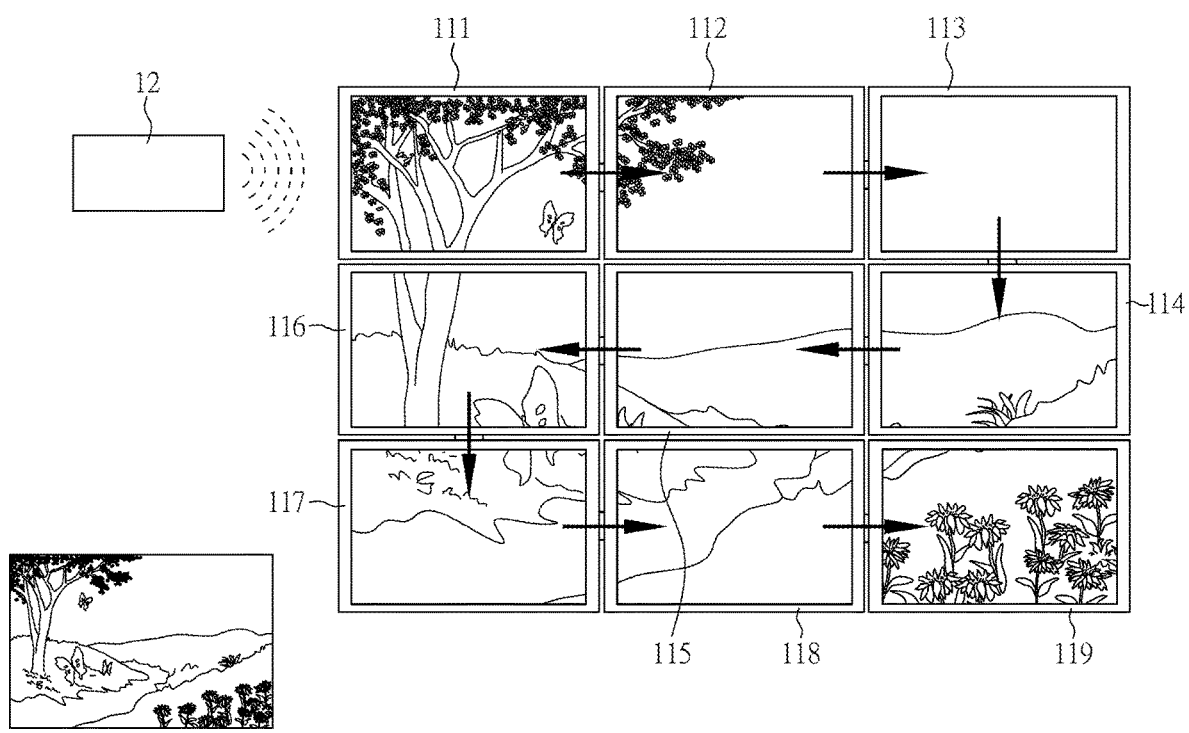
FIG. 5 is a perspective view of a tiled display system according to Embodiment 3 of the present disclosure.

FIG. 5 is a perspective view of a tiled display system of the present embodiment. The tiled display system of the present embodiment is similar to that of Embodiment 1, except that the controller 12 outputs the frame data and the triggering signals to the display devices 111, 112, 113, 114, 115, 116, 117, 118 and 119 in a wireless manner.

Embodiment 4

Figure 6:
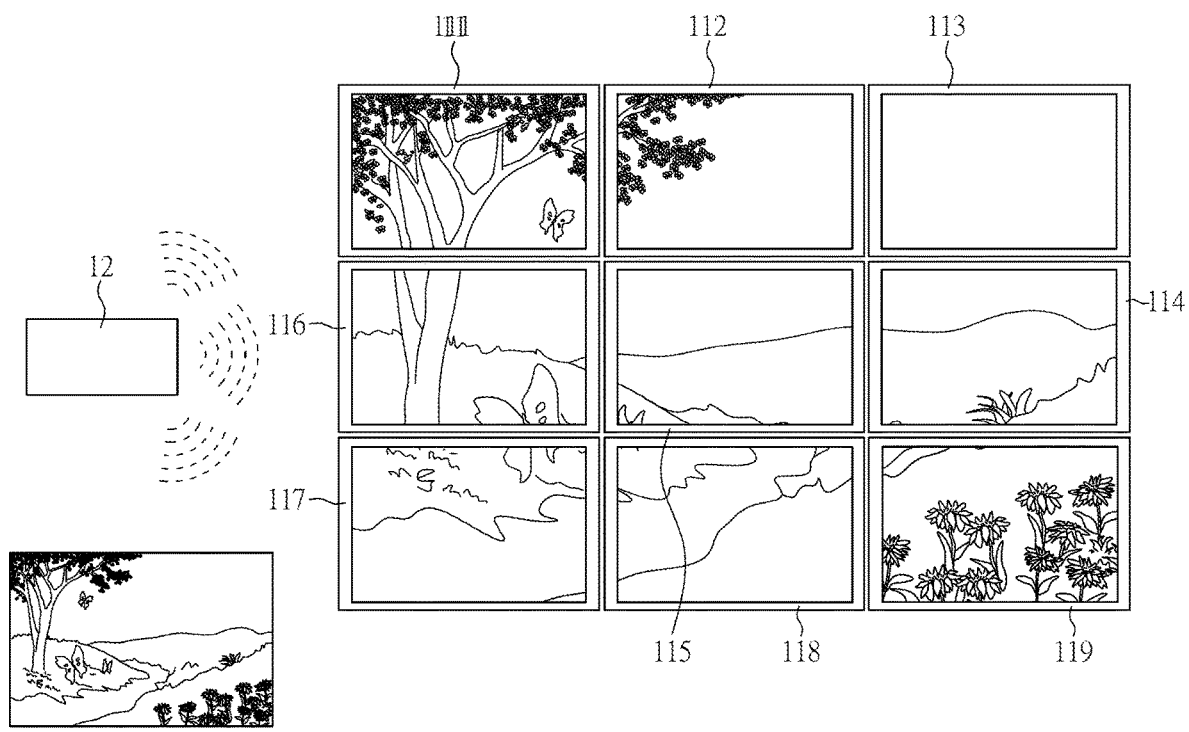
FIG. 6 is a perspective view of a tiled display system according to Embodiment 4 of the present disclosure.

FIG. 6 is a perspective view of a tiled display system of the present embodiment. The tiled display system of the present embodiment is similar to that of Embodiment 2, except that the controller 12 outputs the frame data and the triggering signals to the display devices 111, 112, 113, 114, 115, 116, 117, 118 and 119 in a wireless manner.

In the aforesaid embodiments, the tiled display system comprises nine display devices 111, 112, 113, 114, 115, 116, 117, 118 and 119, which are arranged in juxtaposition and specifically in a 3×3 array. However, the number and the arrangement of the display devices are not limited thereto, and can be adjusted according to the actual requirement.

Embodiment 5

Figure 7A:
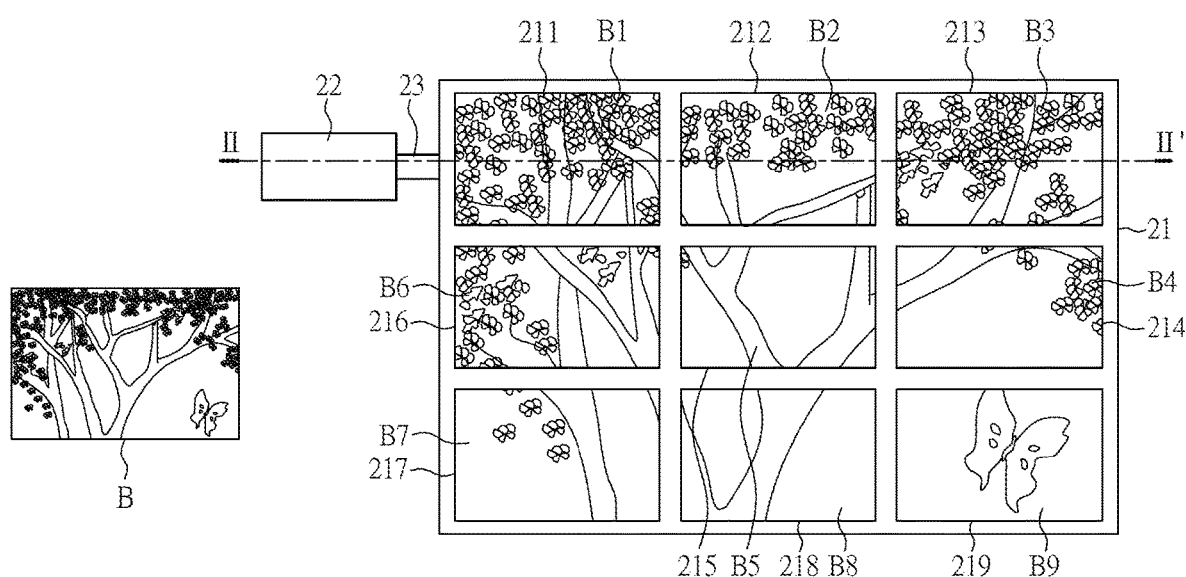
FIG. 7A is a perspective view of a tiled display device according to Embodiment 5 of the present disclosure.
Figure 7B:
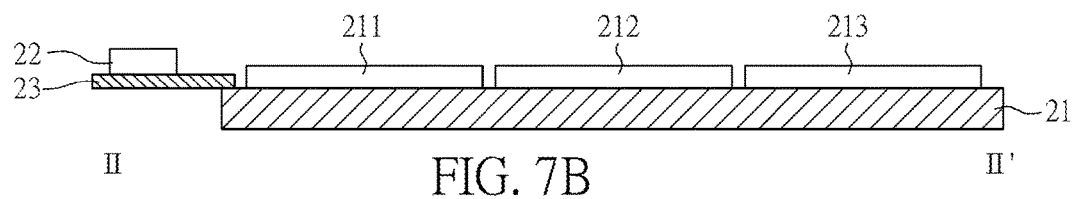
FIG. 7B is a cross-sectional view of a tiled display device according to Embodiment 5 of the present disclosure.

FIG. 7A is a perspective view of a tiled display device of the present embodiment, and FIG. 7B is a cross-sectional view taken along the line II-II' indicated in FIG. 7A.

The tiled display device of the present embodiment comprises: a driving substrate 21; a plurality of display panels 211, 212, 213, 214, 215, 216, 217, 218 and 219 disposed on the driving substrate 21; and a controller 22 driving the display panels 211, 212, 213, 214, 215, 216, 217, 218 and 219 via the driving substrate 21.

Herein, the controller 22 is electrically connected to the driving substrate 21 in a wired manner. In the present embodiment, the controller 22 is electrically connected to the driving substrate 21 via a circuit board 23. In addition, the driving substrate 21 is electrically connected to the display panels 211, 212, 213, 214, 215, 216, 217, 218 and 219.

In the present embodiment, the tiled display device comprises nine display panels 211, 212, 213, 214, 215, 216, 217, 218 and 219, which are arranged in juxtaposition and specifically in a 3×3 array. However, the number and the arrangement of the display panels are not limited thereto, and can be adjusted according to the need.

When a frame B is going to be displayed on the tiled display device, the frame B is divided into a plurality of sub-frames B1 to B9, and the number of the sub-frames B1 to B9 is equal to the number of the display panels 211, 212, 213, 214, 215, 216, 217, 218, 219. In order to make the display panels 211, 212, 213, 214, 215, 216, 217, 218 and 219 synchronously display the frame B, the tiled display device of the present embodiment satisfies the following requirements.

Herein, one of the display panels 211, 212, 213, 214, 215, 216, 217, 218 and 219 that starts displaying first is denoted as a first display panel, and another one of the display panels 211, 212, 213, 214, 215, 216, 217, 218 and 219 that starts displaying last is denoted as a last display panel. The first display panel displays the sub-frame at a first time point, and the last display panel displays the sub-frame at a last time point. The first time point and the last time point satisfy an equation (II):

$$0<(Tm-T1)\le(1/H2)\times[(M-1)/M] \quad (II),$$

where T1 is the first time point, Tm is the last time point, H2 is a refresh rate of each display panel, and M is a number of the display panels 211, 212, 213, 214, 215, 216, 217, 218 and 219. In addition, M is an integer greater than 1. In the present embodiment, M is nine.

Herein, the refresh rate can be in a range from 60 Hz to 3840 Hz, but the present disclosure is not limited thereto.

When the tiled display device satisfies the above requirement, the frame B can be synchronously displayed on the display panels 211, 212, 213, 214, 215, 216, 217, 218 and 219 within a frame time, such as a reciprocal of the refresh rate H2, to improve the flicker problem.

For example, as shown in FIG. 7A, the frame B is a frame to be displayed on the tiled display device. Because the tiled display device of the present embodiment comprises nine display panels 211, 212, 213, 214, 215, 216, 217, 218 and 219, the frame B is divided into nine sub-frames B1 to B9 to be displayed on the display panels 211, 212, 213, 214, 215, 216, 217, 218 and 219, respectively.

The method for transmitting the frame data and the triggering signals of the present embodiment can apply the method illustrated in Embodiment 1 or Embodiment 2, except for the display devices in Embodiment 1 or Embodiment 2 being replaced by the display panels of the present embodiment. In addition, the synchronous timing control shown in FIG. 2 or FIG. 4 can be applied to the tiled display device of the present embodiment, except for the display devices being replaced by the display panels. Thus, a detailed description for the method and the synchronous timing control of the present embodiment is deemed unnecessary.

Embodiment 6

Figure 8:
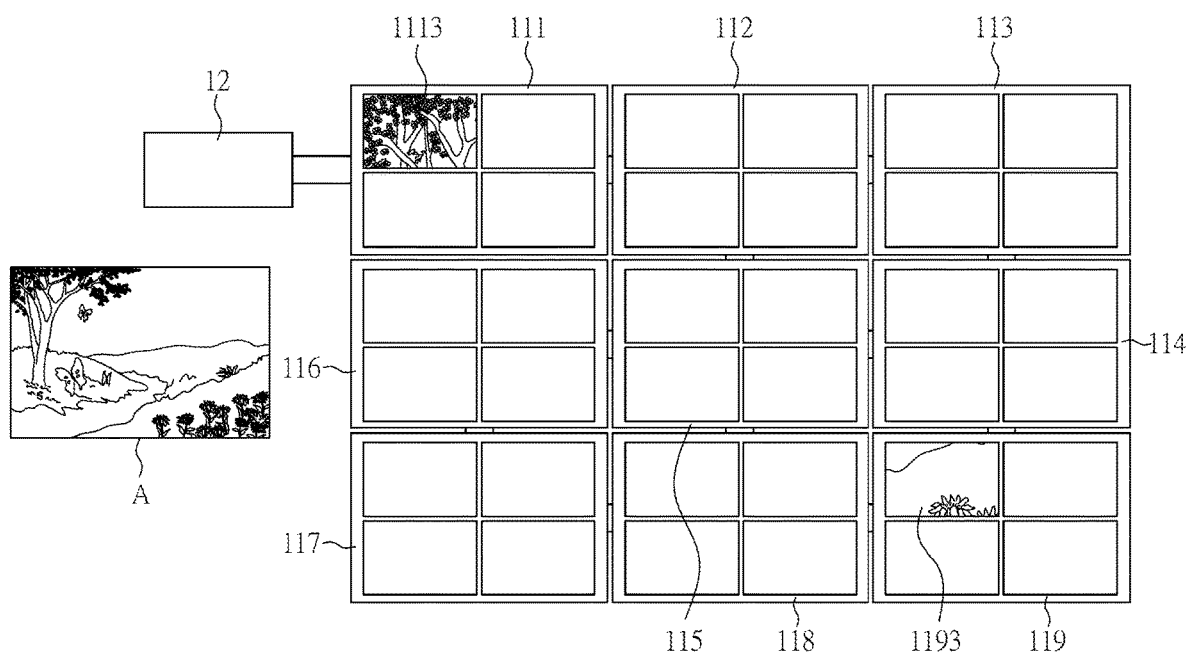
FIG. 8 is a perspective view of a tiled display system according to Embodiment 6 of the present disclosure.

FIG. 8 is a perspective view of a tiled display device of the present embodiment. The tiled display system of the present embodiment is similar to that of Embodiment 1, except for the following differences.

In the present embodiment, each of the display devices 111, 112, 113, 114, 115, 116, 117, 118 and 119 may comprise a plurality of display panels. For example, the display device 111 comprises four display panels, and one of the four display panels is a display panel 1113. In addition, the display device 119 comprises four display panels, and one of the four display panels is a display panel 1193. In the present disclosure, the number and the arrangement of the display devices and the display panels are not limited thereto, and can be adjusted according to the need.

Similar to Embodiment 1, the frame A can be divided into nine sub-frames, and each display devices 111, 112, 113, 114, 115, 116, 117, 118 and 119 display one sub-frame. Similar to Embodiment 5, one of the sub-frames can be divided into four sub sub-frames, and each display panels display one sub sub-frame. For example, the display panel 1113 of the display device 111 displays one sub sub-frame corresponding thereto, and the display panel 1193 of the display device 119 displays one sub sub-frame corresponding thereto.

Herein, the methods for transmitting the frame data and the triggering signals to the display devices are similar to those illustrated in Embodiment 1, and the methods for transmitting the frame data and the triggering signals to the display panels are similar to those illustrated in Embodiment 5. Thus, a detailed description for the methods for transmitting the frame data and the triggering signals used in the present embodiment is deemed unnecessary.

Because the tiled display system of the present embodiment comprises a plurality of display devices and each display devices is a tiled display device comprising a plurality of display panels, the equation (I) illustrated in Embodiment 1 and the equation (II) illustrated in Embodiment 5 are satisfied at the same time to improve the flicker problem. Herein, the refresh rate of the display panel H1 and the refresh rate of the display panel H2 can be the same or different.

In addition, in the present embodiment, the first display device is the display device that starts displaying a sub-frame first, and the time point that one of the display panel comprised in the first display device receives a triggering signal and starts displaying the sub sub-frame first is the first time point (T1). The last display device is the display device that starts displaying a sub-frame last, and the time point that one of the display panel comprised in the last display device receives a triggering signal and starts displaying the sub sub-frame last is the last time point (Tn).

Figure 9:
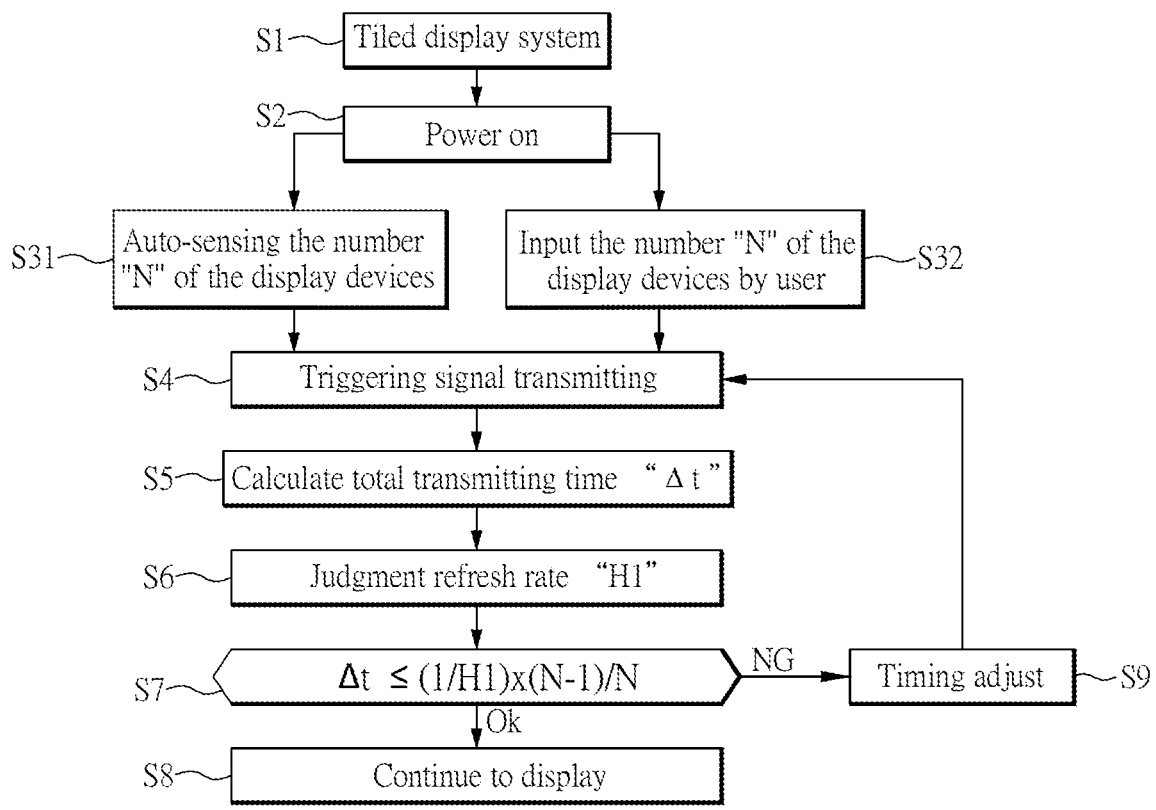
FIG. 9 is a flowchart showing a synchronous timing control algorithm according to one aspect of the present disclosure.

FIG. 9 is a flowchart showing a synchronous timing control algorithm according to one aspect of the present disclosure. The synchronous timing control algorithm may comprise the following steps.

In the step S1, a tiled display system is provided. In the step S2, the tiled display system is powered on. After the tiled display system is powered on, the number "N" of the display devices may be auto-sensed in the step S31, or a user can input the number "N" of the display devices in the step S32. Then, in the step S4, a triggering signal transmitting is performed. In more specifically, a triggering signal is transmitted to the display devices. In the step S5, a total transmitting time "Δt" is calculated, which is the time difference between the first time point (T1) and the last time point (Tn) illustrated in the above embodiments. In the step S6, according to the obtained "Δt", a refresh rate "H1" of the display device is judged. In the step S7, the parameters "N", "Δt" and "H1" are input into the equation: Δt≤(1/H1)×(N−1)/N. If the parameters "N", "Δt" and "H1" satisfy the equation, the tiled display system starts or continues to display (i.e. the step 8). If the parameters "N", "Δt" and "H1" do not satisfy the equation, the timing has to be adjusted (i.e. the step 9), and the process goes back to the step S4.

The synchronous timing control algorithm can also be used in the tiled display device, except that the display number "N" is replaced by the display number "M" of the display panels, the refresh rate "H1" of the display device is replaced by the refresh rate "H2" of the display panel, and the equation shown in FIG. 9 is replaced by Δt≤(1/H2)×(M−1)/M.

In the present disclosure, a high-speed camera can be used to record the displaying of the tiled display system or the tiled display device, so as to identify whether the target display system or display device is the tiled display system or tiled display device of the present disclosure or not.

For the tiled display system recorded by the high-speed camera, when a sub-frame of one frame is displayed first, the display device displaying the sub-frame of the one frame first is the first display device, and this time point is defined as the first time point (T1). When another sub-frame of the one frame is displayed last, the display device displaying this sub-frame of the one frame last is the last display device, and this time point is defined as the last time point (Tn).

For the tiled display device recorded by the high-speed camera, when a sub-frame of one frame is displayed first, the display panel displaying the sub-frame of the one frame first is the first display panel, and this time point is defined as the first time point (T1). When another sub-frame of the one frame is displayed last, the display panel displaying this sub-frame of the one frame last is the last display panel, and this time point is defined as the last time point (Tm).

For the tiled display system with tiled display device recorded by the high-speed camera, when a sub-frame of one frame is displayed first, the display device displaying this sub-frame is the first display device, and the time point that a sub sub-frame of this sub-frame is displayed first is defined as the first time point (T1). When another sub-frame of the one frame is displayed last, the display device displaying this sub-frame is the last display device, and the time point that a sub sub-frame of this sub-frame is displayed last is defined as the last time point (Tn).

In the aforesaid embodiment, the display panel, for example, the display panel 1112 shown in FIG. 1B or the display panels 211, 212, 213, 214, 215, 216, 217, 218 and 219 shown in FIG. 7A and FIG. 7B may comprise a pixel array. In addition, the display panel may further comprise liquid crystals (LCs), quantum dots (QDs), fluorescence molecules, phosphors, organic light-emitting diodes (OLEDs), inorganic light-emitting diodes (LEDs), mini light-emitting diodes (mini-LEDs), micro light-emitting diodes (micro-LEDs), or quantum-dot light-emitting diodes (QLEDs). It could be understood that the chip size of the LED can be 300 m to 10 mm, the chip size of the mini-LED can be 100 μm to 300 μm, and the chip size of the micro-LED can be 1 μm to 100 μm. But the present disclosure is not limited thereto.

When the display panel is a liquid crystal display panel, the pixel array may comprise plural pixel electrodes. When the display panel is an OLED, LED, mini-LED, micro-LED, or QLED display panel, the pixel array may comprise anode electrodes and cathode electrodes. However, the present disclosure is not limited thereto.

The display panel and the display device made as described in any of the embodiments of the present disclosure as described previously can be co-used with a touch panel to form a touch display device. The tiled display device of the present disclosure can be applied to any electronic devices that need a display screen, such as displays, mobile phones, laptops, video cameras, still cameras, music players, mobile navigators, TV sets, and other electronic devices that display images. The tiled display system of the present disclosure can be applied to any electronic devices that need to display large images, such as video walls, and advertising boards.

Although the present disclosure has been explained in relation to its embodiment, it is to be understood that many other possible modifications and variations can be made without departing from the spirit and scope of the disclosure as hereinafter claimed.

What is claimed is:

1. A tiled display system, comprising:
a plurality of circuit boards;
a plurality of display devices electrically connected to each other via the plurality of circuit boards; and
a controller driving the plurality of display devices to enable each display device to display a sub-frame, all sub-frames being tiled as one frame,
wherein the display devices comprise: a first display device that starts displaying first, a second display device that is disposed adjacent to the first display device and a last display device that starts displaying last, the first display device displays the sub-frame at a first time point, the last display device displays the sub-frame at a last time point, and the first time point and the last time point satisfy an equation:

$$0<(Tn-T1)\leq(1/H1)\times[(N-1)/N],$$

where T1 is the first time point, Tn is the last time point, H1 is a refresh rate of each of the display devices, and N is a number of the display devices,
wherein the first display device comprises a first driving substrate and a first display panel disposed on the first driving substrate, the second display device comprises a second driving substrate and a second display panel disposed on the second driving substrate, one of the plurality of circuit boards is disposed under the first display device and the second display device, the one of the plurality of circuit boards is at least partially overlapped with the first display device and the second display device in a normal direction of the first driving substrate, and the one of the plurality of circuit boards is electrically connected with the first display device and the second display device, wherein the one of the plurality of circuit boards crosses a boundary between the first driving substrate and the second driving substrate.

2. The tiled display system of claim 1, wherein the controller outputs frame data of the frame to the plurality of display devices.

3. The tiled display system of claim 2, wherein the plurality of display devices are electrically connected to each other in a cascading manner and the frame data is transmitted to the plurality of display devices in a sequence of cascading.

4. The tiled display system of claim 2, wherein the frame data is directly transmitted to the plurality of display devices.

5. The tiled display system of claim 2, wherein the frame data is transmitted to the plurality of display devices in a wired or wireless manner.

6. The tiled display system of claim 1, wherein the controller outputs a plurality of triggering signals, each driving one of the plurality of display devices.

7. The tiled display system of claim 6, wherein the plurality of display devices are electrically connected to each other in a cascading manner, and the plurality of triggering signals are respectively transmitted to the plurality of display devices in a sequence of cascading.

8. The tiled display system of claim 6, wherein each of the plurality of triggering signals is directly transmitted to one of the plurality of display devices.

9. The tiled display system of claim 6, wherein the plurality of triggering signals are transmitted to the plurality of display devices in a wired or wireless manner.

10. The tiled display system of claim 1, wherein the refresh rate is in a range from 60 Hz to 3840 Hz.

11. The tiled display system of claim 1, wherein the controller outputs frame data of the frame to the plurality of display devices first and then outputs a plurality of triggering signals, and each of the plurality of triggering signals drives one of the plurality of display devices.

12. The tiled display system of claim 1, wherein the plurality of display devices are arranged in juxtaposition.

13. A tiled display device, comprising:
a driving substrate;
a plurality of display panels disposed on the driving substrate; and
a controller electrically connected to the driving substrate via a circuit board, and the controller driving the plurality of display panels via the driving substrate to enable each display panel to display a sub-frame, all sub-frames being tiled as one frame, wherein the display panels comprise: a first display panel that starts displaying first and a last display panel that starts displaying last, the first display panel displays the sub-frame at a first time point, the last display panel displays the sub-frame at a last time point, and the first time point and the last time point satisfy an equation:

$$0 < (Tm-T1)(1/H2) \times [(M-1)/M],$$

where T1 is the first time point, Tm is the last time point, H2 is a refresh rate of each of the display panels, and M is a number of the display panels, wherein the circuit board is electrically connected to the driving substrate and;

wherein, in a normal direction of the driving substrate, a part of the circuit board is overlapped with the driving substrate and another part of the circuit board is not overlapped with the driving substrate.

14. The tiled display device of claim 13, wherein the controller outputs frame data of the frame to the plurality of display panels.

15. The tiled display device of claim 14, wherein the frame data is directly transmitted to the plurality of display panels.

16. The tiled display device of claim 13, wherein the controller outputs a plurality of triggering signals, each driving one of the plurality of display panels.

17. The tiled display device of claim 16, wherein each of the plurality of triggering signals is directly transmitted to one of the plurality of display panels.

18. The tiled display device of claim 13, wherein the refresh rate is in a range from 60 Hz to 3840 Hz.

19. The tiled display device of claim 13, wherein the controller outputs frame data of the frame to the plurality of display panels first and then outputs a plurality of triggering signals, and each of the plurality of triggering signals drives one of the plurality of display panels.

20. The tiled display device of claim 13, wherein the plurality of display panels are arranged in juxtaposition.

* * * * *